Figure 1:
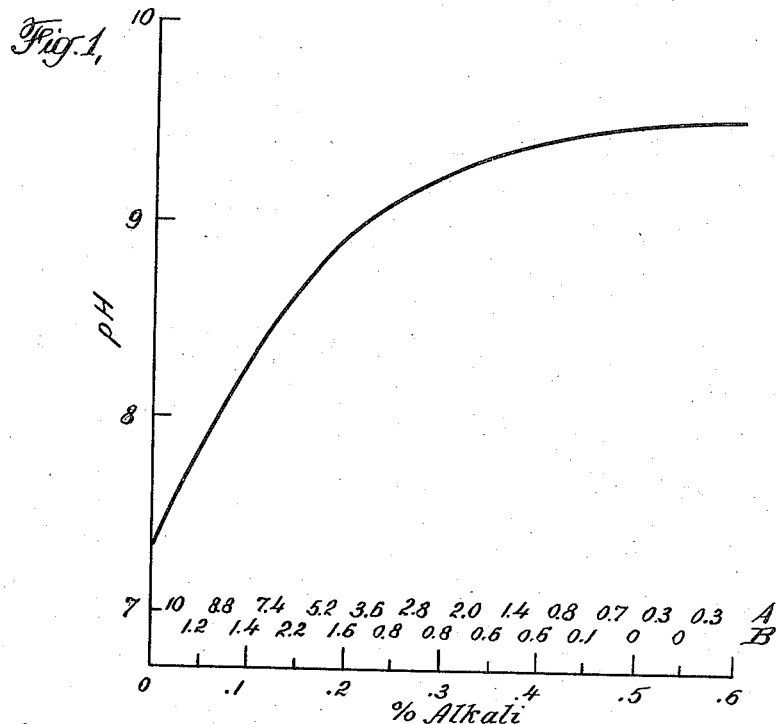

July 1, 1941.  G. J. BARKER ET AL  2,247,467
PROCESS OF TREATING CLAYS
Filed Aug. 1, 1940    4 Sheets-Sheet 1

INVENTORS
GEORGE J. BARKER
& EMIL TRUOG
BY
Charles W. Brown
ATTORNEY

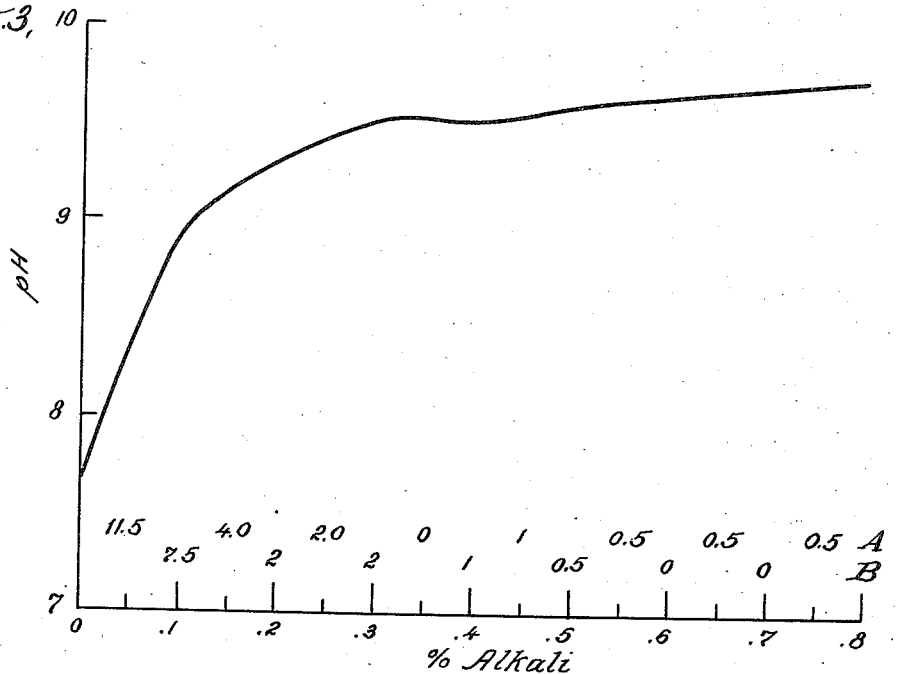
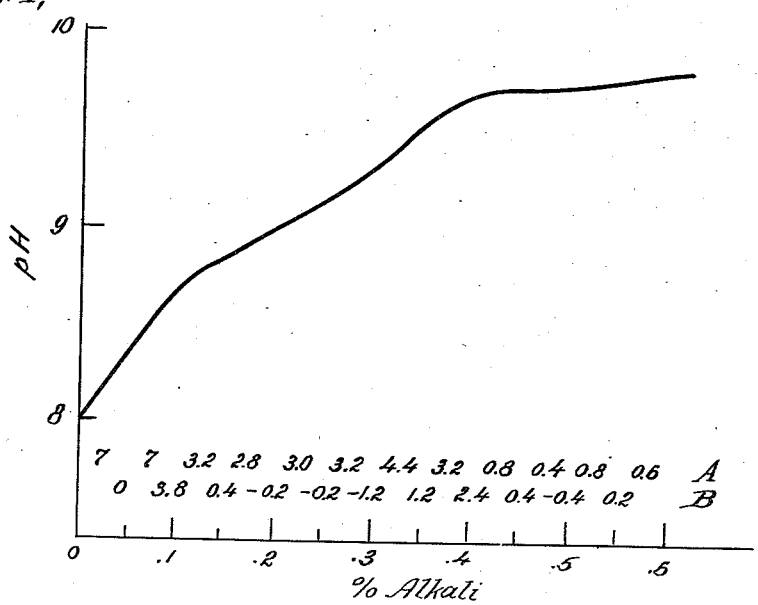

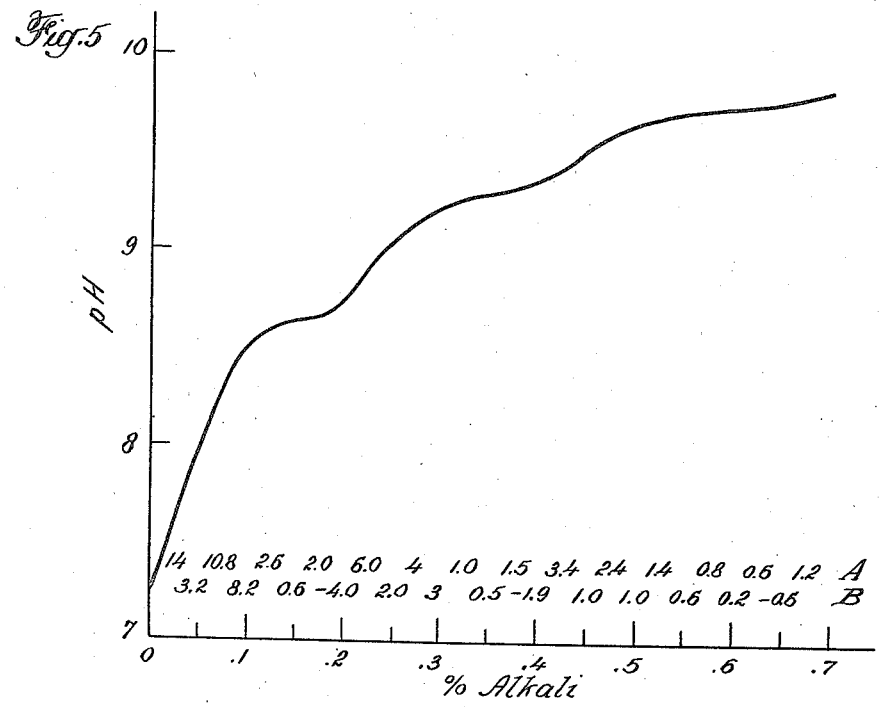
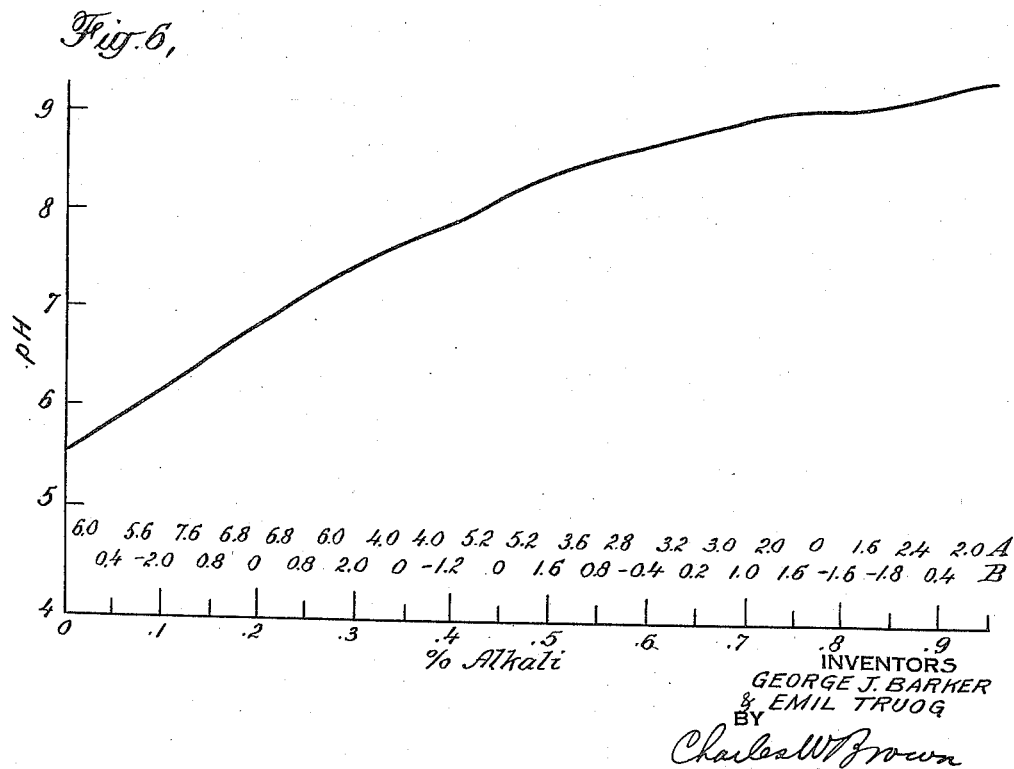

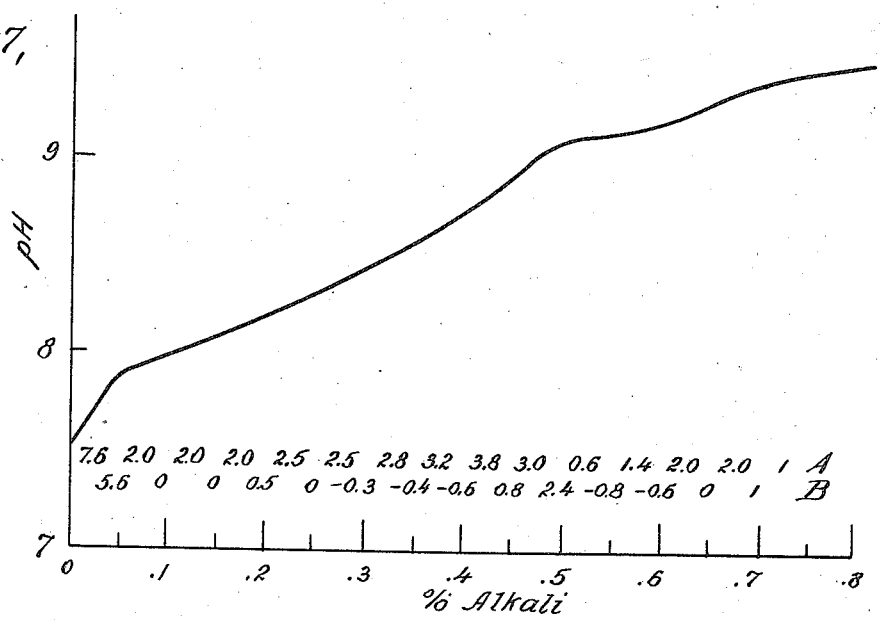
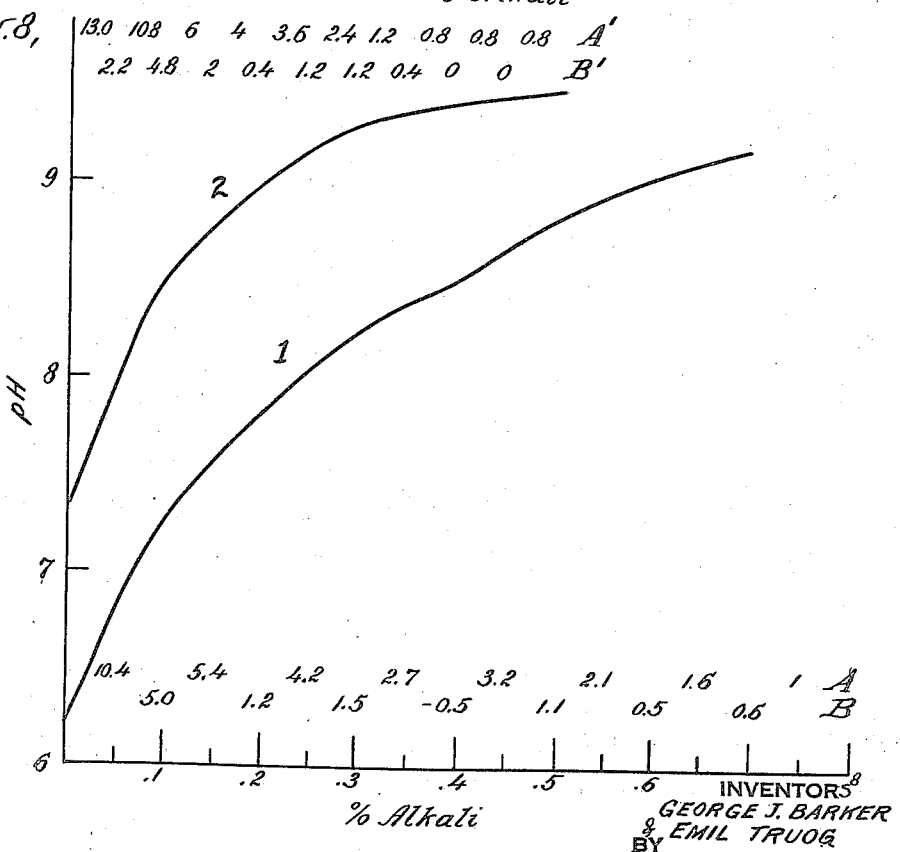

Patented July 1, 1941

2,247,467

UNITED STATES PATENT OFFICE 2,247,467

PROCESS OF TREATING CLAYS

George J. Barker and Emil Truog, Madison, Wis., assignors to Wisconsin Alumni Research Foundation, Madison, Wis., a corporation of Wisconsin Application August 1, 1940, Serial No. 349,166

9 Claims. (Cl. 106—72)

This invention relates to a process for treating clay and clay mixtures in the manufacture of clay ware, such as brick, building tile, drain tile, sewer pipe and terra cotta, by the stiff or soft mud processes from common clays. The invention is particularly directed to a controlled treatment of clay with alkaline material, whereby this treatment is specifically adapted to any particular clay used in the stiff or soft mud processes for manufacturing the aforedescribed products.

In the stiff or soft mud processes for the manufacture of brick, tile, sewer pipe, etc., common clays are used. Such clays are characterized by their consisting of a great variety of minerals together with more or less organic material. Few, if any, contain one predominating mineral. In contrast to these common clays, kaolin, ball clays and the like, used in the manufacture of the special and finer grades of clay products, contain a predominating amount of a single mineral. For example, a Kentucky ball clay may consist of over 90% of the mineral kaolinite.

Products, such as white wares, are commonly made from the relatively pure clays or kaolins by the so-called slip process. In the slip process, a fluid mixture of the clay with water is prepared. This mixture may be directly used for the production of a product of desired shape by introducing the fluid mixture into a porous mold or form which will absorb the water from the mixture leaving the interior of the form coated with the desired thickness of clay to form the object being made. By removing water from the clay mixture, the formed product is sufficiently firm for it to retain its shape when removed from the mold and given the further treatment, including firing, to produce the final article. In another type of slip process the fluid clay mixture is dewatered to leave the clay in a suitably plastic state for it to be molded into the desired form and retain the shape given it during subsequent treatment.

In the slip processes, a large proportion of the water in the fluid clay mixture is removed, carrying with it soluble salts in solution. These salts, for the most part, are not left in the clay product and do not remain therein during the drying and firing to affect the character of the final product.

By contrast with the slip processes, in the stiff and soft mud processes, by which the impure, common clays are treated to make brick, tile, etc., the clay is mixed with that amount of water which will give a suitably plastic condition for the clay to be molded into the desired form and to retain its shape during handling, drying and firing. The stiff and soft mud processes differ from each other in the relative stiffness of the plastic clay mass which is to be formed. In a stiff mud process, the plastic mass is sufficiently firm for it to be extruded through a die or otherwise pressed or molded into the desired form and for the formed mass to be sufficiently stiff for it not to become deformed by flowing under the influence of gravity. In a soft mud process, the plastic clay mass is less stiff and more readily changes shape. It is not adaptable, therefore, to being extruded and to retain the shape given it by a die. The plastic mass is, however, stiff enough for it to retain its shape after removal from a mold into which it has been pressed. The molding of the clay mass in the soft mud process does not involve, however, removal of water carrying with it soluble constituents of the plastic mass. In both the stiff and the soft mud processes all of the materials originally present in and added to the clay, even those materials which are soluble, remain in the molded product to affect the characteristics of the molded clay and of the final fired product.

Extraneous materials added to a clay to be used in the stiff or soft mud process, since they remain in the clay through to the finished product, may greatly influence the characteristics of the clay; even to render it unfit for use in these processes. The introduction of soluble electrolytes particularly (salts, bases or acids) even in very small amounts may have very deleterious effects upon the character of the plastic clay and the products made from the clay. For example, as little as 0.6% of sodium carbonate or caustic soda added to a clay used in the stiff mud process for making brick was found to cause scumming of the brick (the formation of a deposit of the alkali on the surface of the brick during drying), and the formation of a glaze on the fired brick which made it unsuited for use.

It has long been recognized that the character of clays used in the slip process and their adaptability to being used in such a process may be affected by treatment with an alkali. For example, it is known that by adding an alkali such as caustic soda or sodium carbonate in the preparation of a clay slip, deflocculation of the clay may be promoted and the fluidity of the slip with a given amount of water increased. Accordingly, it has been proposed to add an alkali to slip process clays to improve their adaptability for the preparation of clay slips. So far as we have been able to discover, however, prior to our invention no use of alkalies to modify the characteristics of plastic clay masses has been made in manufacturing clay ware from common clays by the stiff or soft mud processes. Suggestions that addition of alkali to clays used in the slip process improve that process appear never to have influenced the art of manufacturing clay ware from common clays by the stiff or soft mud processes. The great diversity in the characteristics of common clays, due to their widely varying compositions, and the fact that in the stiff and soft mud processes any material added to the clay remains therein to affect the character of the clay throughout the process and of the final clay products, sets these processes apart from the slip processes.

It is, therefore, an object of this invention to provide a process for the treatment with alkaline material of common clays used in the stiff and soft mud processes whereby economies may be obtained in the cost of manufacturing clay products by those processes and, more particularly, whereby products of superior qualities are obtained with respect to their strength, appearance and resistance to absorption of water, for example. It is a further object of this invention to make possible the use in the stiff and soft mud processes of clays which heretofore were not suitable for this purpose. Many clays give finished products which are so porous that they absorb excessive amounts of water and as a consequence rapidly deteriorate when exposed to the weather. Many clays which for these and other reasons, heretofore were not suitable for use in the stiff and soft mud processes, may be used in those processes to give satisfactory products by treating them in accordance with this invention. Further, it is an object of this invention to provide a method of controlled treatment with alkaline material of clay used in the stiff or soft mud processes whereby any particular clay is appropriately treated to obtain the aforedescribed and other advantages of this invention which will be hereinafter described or will be obvious in the light of this specification.

We have discovered that the workability and other qualities of many clays and clay mixtures used in the stiff and soft mud processes for the manufacture of brick, tile and other clay ware, may be greatly improved by the addition to the clay of certain definite proportions of an alkaline compound of an alkali metal or of ammonia. (Hereinafter, in using the term "alkali metal," it is used in a broad sense to include not only sodium, potassium, and the other metals to which the term "alkali metal" is commonly limited, but also to include in addition thereto the closely related ammonium radical.) We have discovered that the quantity of alkaline material which will produce the desired improvement in the character of the clay is related both to the change in pH value produced by the addition of the alkaline material to a given clay and to the base exchange capacity and character of the basic constituents satisfying the base exchange capacity of the clay.

We have discovered that one of the aforementioned alkaline compounds may be used successfully for treating clay from which clay products are manufactured by the stiff or soft mud process, if an alkaline material is added to the clay in amount controlled in accordance with a particular relationship between the amount of alkaline material added to the clay and the increase in pH of the clay produced thereby and if at least a part of the total alkaline material added to the clay is an alkaline compound of an alkali metal and the amount of this compound added to the clay is such that more than 20% of the base exchange capacity of the clay is saturated with alkali metal after addition of the alkaline material to the clay.

To determine the quantity of total alkaline material which should be added to a given clay in accordance with our invention, the clay is mixed with water and with various quantities of alkali to determine the change in pH of the clay-water mixture caused by different additions of alkali. From the data thus obtained one ascertains the slopes of the pH titration curve. These slopes are the numerical value of the change in pH of the clay divided by the corresponding change in the amount of alkali added to the clay. They are represented by the formula $$\frac{\Delta pH}{\Delta alkali}$$

in which $\Delta$ pH represents an increment in the pH of the clay and $\Delta$ alkali represents the increment in the amount of alkali added which caused that increment in pH. These increments in pH and alkali are suitably small for the slopes of the titration curve to be determined with reasonable accuracy.

The titration curves thus obtained show two portions distinguished from each other by the relative magnitude of their slopes or the amount by which the pH of the clay is increased by a given increment in the alkali added. The curves show an initial portion or section having large slopes and a later portion or section having relatively small slopes. Between these two portions lies an intermediate portion or section of the curve, in which the slopes change from high to low. This intermediate portion represents a break in the pH curve. At this break in the curve the decrease in the slopes of the curve is usually large, about two or more times greater than the decrease in the slopes of the curve at higher pH values.

Having thus determined this break in the pH titration curve and the pH values corresponding thereto, they serve as control points for the treatment of the clay with alkaline material in using it in the stiff or soft mud process. Alkaline material is added to the clay, before or during its pugging or mixing with water to form a plastic mass, in amount which gives the clay a pH in the range of 7 to 9, for an initially acid clay, or in the range of 8 to 10, for an initially non-acid clay. The amount of alkaline material is further limited to substantially that which raises the pH of the clay to substantially the pH values, within the foregoing respective range for the particular clay being used, of the above described break in the pH titration curve for the clay or to those values at which the decrease in the slopes of the alkalimetric titration curve of the clay is at least substantially twice as great as the decrease in the slopes of said curve at higher pH values.

The alkaline material added to the clay may consist in whole or in part of an alkaline compound of an alkali metal (including ammonium compounds). In case the alkaline material is only in part a compound of an alkali metal, the latter is added in sufficient amount so that the clay to which the alkaline material has been added has at least 20% of its base exchange capacity saturated with alkali metal.

Usually the same alkaline compound of an alkali metal, such as soda ash, will be used in making the alkalimetric pH titration of a clay and for treatment of the clay in manufacturing clay ware therefrom. In that case, when the clay is to be treated only with the alkali metal compound, it is added to the clay in the proportions indicated by the titration to raise the clay to the requisite pH. In other cases, particularly when treating strongly acid clays, it is desirable to add an alkaline compound of an alkaline earth or magnesium to obtain in part the desired increase in pH of the clay. Barium carbonate, oxide or hydroxide is added to clays high in soluble sulfates to form insoluble compounds therefrom. These barium compounds also effect, in part, the desired increase in pH of the clay. The alkaline compounds of the alkaline earths and magnesium are not stoichiometric equivalents of the alkaline compounds of the alkali metals in their effect upon the pH of clay. Accordingly, when one or more of the former compounds are to be used, they should first be added to the clay and the quantity of alkali metal compound required to raise the pH to the desired value then determined.

The following examples will illustrate and more fully explain the methods for treating clays in accordance with our invention. The accompanying drawings illustrate alkalimetric pH titration curves of these examples.

*Example I.*—To a series of representative 20 gram samples (dry basis) of the clay in the same condition as it is used in the factory, contained in beakers, 50 cc. of distilled water are added to each sample together with varying amounts of sodium carbonate. In the testing of a clay a series of 11 samples usually will be adequate, to which are added 0 to 1% of sodium carbonate in increments of 0.1%. After about 30 minutes, with occasional stirring, the pH of the clay suspension is determined by a hydrogen ion electrometer using a glass electrode. The resulting pH values are plotted against the percentages of sodium carbonate and a curve drawn through the points thus determined. Any additional pH values necessary to accurately locate any portions of the curve are, of course, determined.

Fig. 1 of the accompanying drawings shows the significant portion of a curve thus obtained for a clay used in the manufacture of brick by the soft mud process. In this, and also in the other figures of the accompanying drawings, percentages of sodium carbonate added are plotted as abscissas against the resulting pH values of the clay-water mixture as ordinates. The series of numbers indicated by the letter A on Fig. 1 are the slopes of the various sections of the curve corresponding to increments of 0.05% in the amount of soda ash added to the clay. Thus the curve between 0 and 0.05% of added alkali has a slope of 10, calculated as follows: $\Delta pH = 0.5$ $\Delta$alkali added $= 0.05$ $$\frac{0.5}{0.05} = 10$$

The curve between 0.05% and 0.1% of alkali has a slope of 8.8, calculated as follows: $\Delta pH = 0.44$ $\Delta$alkali added $= 0.05$ $$\frac{0.44}{0.05} = 8.8$$

The values for slopes of the remaining sections of the curve as indicated in Fig. 1 have been calculated in the above manner.

The numbers indicated by the letter B on Fig. 1 are the differences between the slopes of the two sections of the curve adjacent each point corresponding to an increment of 0.05% of alkali. They are the numerical values for the rate of change in the slopes of the two adjacent sections of the curve. For example, at the point corresponding to 0.05% alkali, the preceding and succeeding portions of the curve have slopes of 10.0 and 8.8, respectively. The rate of change in the slopes of the curve of this section from 0.0 to 0.1% alkali is the difference between 10.0 and 8.8; i. e., 1.2.

It will be seen that the decreases in slopes of the curve for that portion corresponding to 0.25 or more alkali are in the order of 0.8, 0.8, 0.6, 0.6, 0.1. This is the section of the curve where increments in alkali added to the clay produce about the same, small decrease in the slopes of the curve. For the section corresponding to 0.2% to 0.25% alkali, the decrease in the slope, as compared with the preceding section from 0.15% to 0.2% alkali, is 1.6; two or more times as large as the decreases in the slopes of the curve at higher pH values. The section of the curve corresponding to about 0.2% of akali added, e. g. 0.15 to 0.3, represents the portion at which the curve breaks from the rapidly rising portion representing initial additions of alkali to the latter portion, where there is little increase in the pH of the clay with alkali addition and change in the slopes of the pH titration curve. The break in the curve comes at a pH of about 8.6 to 9.3.

In using this clay for the production of brick by the soft mud process, alkaline material is added in substantially that amount which gives the clay a pH of 8.6 to 9.3. Thus, 0.26% of soda ash (sodium carbonate) may be mixed with the clay prior to or simultaneously with mixing the clay with water to form the plastic mass which is extruded by a brick-making machine. This amount of alkali produces the best results with respect to improving the strength and reducing the water absorption of the brick product.

Figure 2:
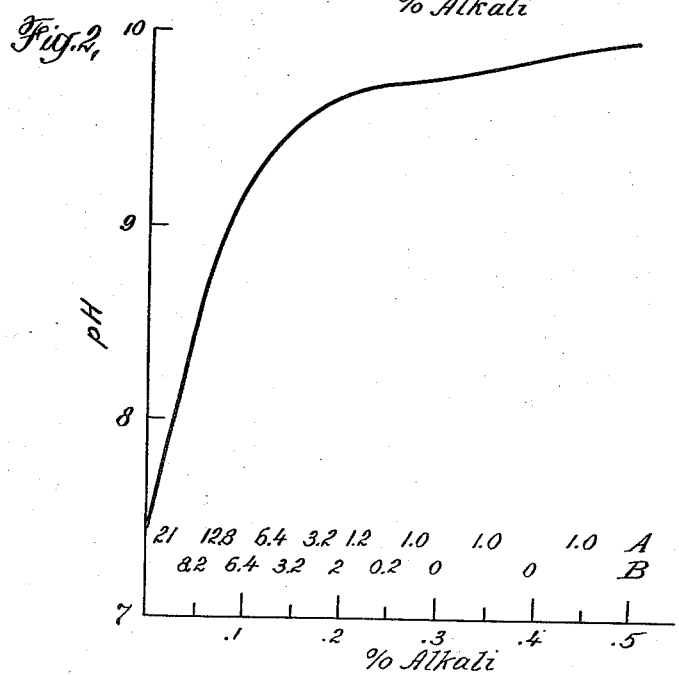

*Example II.*—The clay of this example was one used for the production of glazed wall tile by the stiff mud process. Titration of this clay with sodium carbonate gave the data whereby the curve of Fig. 2 was plotted. The numbers indicated by A on this figure are the slopes of the sections of the curve representing increments of 0.05% or 0.1% (as indicated in the figure) in the sodium carbonate added in titrating the clay.

This curve shows that above 0.2% the addition of alkali changes but little the pH of the clay. The region between 0.1% and 0.2%, corresponding to pH 9.2 to 9.7, shows decreases in the slopes of the curve which are two or more times greater than the decreases in the slopes at high pH values. Accordingly, in treating this clay in accordance with our invention, about 0.1% to about 0.2%, preferably 0.13%, soda ash is incorporated in the plastic clay-water mixture from which the wall tile is manufactured.

*Example III.*—The alkalimetric pH titration curve for the clay of this example, using sodium carbonate, is shown in Fig. 3. The slopes for the sections of the curve corresponding to increments of 0.1% in addition of sodium carbonate are indicated by the letter A and the changes in slope by B.

The break in this curve comes at about 0.1% to 0.3% of alkali, corresponding to a pH of 8.8 to 9.5. In treating this clay in accordance with our invention, it is preferably mixed with about 0.14% soda ash to raise to about 9.1 the pH of the plastic clay mass which is given the shape of the desired product.

*Example IV.*—The alkalimetric titration curve for the clay of this example, using sodium carbonate, is shown in Fig. 4. From the slopes of sections of the curve, indicated by the letter A, corresponding to increments of 0.5% in alkali addition, the numerical values of the changes in the slopes at each point corresponding to these increments in alkali addition are derived in the manner described in connection with the curve of Example I. These values are indicated by the letter B.

This curve shows an initial section, corresponding to additions of below 0.4% of alkali, where the pH of the clay increases rapidly from 8 to about 9.7 as increasing amounts of the alkali are added. At pH values above 9.7, corresponding to above 0.4% of alkali, the curve shows the addition of alkali increases the pH of the clay very little as compared with alkali additions below 0.4%; i. e., the average slope of the curve from 0.4% to 0.6% alkali $$\left(\frac{0.15}{0.2}=0.75\right)$$

is only about one-sixth of the average slope of the curve from 0 to 0.4% alkali $$\frac{1.7}{0.4}=4.25$$

A well defined break in the curve at 0.4% alkali, corresponding to a pH of about 9.7, separates the above two portions of the curve. At about 0.4% alkali addition the decrease in the slope of the curve is, as indicated in Fig. 4, 2.4 as compared with decreases of about 0.4, −0.4 and 0.2 at higher pH values. Accordingly, in treating this clay with alkaline material in accordance with our invention, an amount of alkali is added which raises the pH of the clay to about 9.7; e. g., 0.3% to 0.4% soda ash is added.

The clay of this example is a calcareous clay used in manufacturing drain tile. The plant using this clay was experiencing great difficulty from longitudinal cracks forming in the tile both during and after the tile was fired. Visual examination of the dried tile before firing disclosed no cracks. Nevertheless, when a freshly formed green tile was cut longitudinally and laid out flat, numerous parallel cracks opened up in the plastic material. These cracks were evidence of planes of weakness in the freshly formed tile due to failure of the clay particles to knit together properly. Using our invention, substantially 0.34% soda ash was incorporated in the plastic clay-water mixture. Green tile formed from the thus treated clay, when cut longitudinally, exhibited no longitudinal cracking of the clay even when the plastic material was bent back and forth several times. The proportion of tiles which cracked during and after firing was greatly reduced when the clay was thus treated with soda ash.

*Example V.*—The clay of this example was one used for the production of brick by the soft mud process.

The alkalimetric pH titration curve for this clay, using sodium carbonate, is shown in Fig. 5. The slopes of the curve and the decrease in the slopes of sections of the curve at points corresponding to increments of 0.5% added alkali, are indicated by the letters A and B, respectively.

The break in this pH curve which precedes the portions at which further additions of alkali cause relatively little increase in the pH of the clay comes at an alkali addition of about 0.3%, corresponding to a pH of 9.2. At this break in the curve the decrease in slope of the curve is large as compared with the decrease in slope at higher pH values. In treating this clay in accordance with our invention, it is mixed with sufficient alkaline material to raise its pH to about 8.8 to 9.3, preferably with 0.3% soda ash.

*Example VI.*—The clay of this example was one used in the stiff mud process for making brick. The alkalimetric pH titration curve for this clay, using sodium carbonate, is shown in Fig. 6. The slopes of the curve for increments of 0.05% alkali are indicated by the letter A and the decreases in the slopes at the points corresponding to these increments in alkali are indicated by the letter B.

This curve shows three breaks. Reading from right to left, these breaks come at additions of 0.75%, 0.5% and 0.3% alkali. The first of these breaks corresponds to a pH above the upper limit of 9 to which an acid clay (this is an example of an acid clay) may be raised by addition of alkaline material in accordance with our invention. Accordingly, the break at 0.5% alkali, corresponding to a pH of about 8.4 is used as the control point for treating this clay in accordance with our invention.

When soda ash alone is added to raise the pH of the clay substantially to this break in the curve, we prefer to treat the clay with 0.4% soda ash. Better results are obtained, however, by adding both calcium hydroxide and soda ash, e. g. about 0.2% soda ash with enough calcium hydroxide so that the pH of the treated clay is 8.4.

*Example VII.*—This clay was one used in the stiff mud process for the production of brick. Its alkalimetric pH titration curve, using sodium carbonate, is shown in Fig. 7 with slopes for the sections of the curve and the differences between slopes of adjacent sections indicated by the letters A and B respectively.

The curve shows a marked break at an alkali addition of 0.5%, corresponding to a pH of 9.1 before the upper portion of the curve is reached where the addition of alkali makes relatively small change in the pH of the clay. When this clay is used for brick making, we prefer to add 0.5% soda ash to the clay.

*Example VIII.*—The clay of this example is one used for making brick by the stiff mud process. The alkalimetric titration of this clay, using sodium carbonate, gave the data for the pH curve shown in Fig. 8 and designated by the numeral 1. A indicates the slopes of this curve and B the difference between these slopes adjacent the points corresponding to increments of 0.1% alkali added to the clay. The curve shows an inflection at about 0.4% alkali addition. As a result of this inflection, two closely adjoining breaks, with relatively rapid decrease in the slopes of the curve, as compared with the slopes at higher pH values, occur at about 0.3% and at about 0.5% alkali addition. These breaks correspond to pH values of 8.4 and 8.8. In treating this clay in accordance with our invention 0.3% to 0.5%, preferably 0.34% soda ash is incorporated in the clay-water mixture forming the plastic mass which is shaped, dried and fired to produce bricks.

Curve 2 of Fig. 8 shows the data obtained by mixing 0.05% calcium hydroxide with the clay of this example and then adding various proportions of sodium carbonate to samples of the clay treated with calcium hydroxide. The addition of the calcium hydroxide raised the pH of the acid clay to 7.3. The figures designated $A^1$ are the slopes of the curve for increments of .05% added sodium carbonate. The decreases in these slopes adjacent each point representing an increment of .05% alkali are designated by the letter $B^1$.

Within the range pH 7 to 9 to which the pH of this initially acid clay may be adjusted in carrying out our invention, curve 2 exhibits a break at about the point corresponding to the addition of 0.15% sodium carbonate in addition to the 0.05% calcium hydroxide. This corresponds to a pH of 8.8. In treating this clay to adjust its pH and to obtain a suitable saturation of its base exchange with sodium in accordance with our invention, the above amounts of calcium hydroxide (0.05%) and sodium carbonate (0.15% added as soda ash) may be mixed with the clay which, with water, forms the plastic mass from which brick is made by the soft mud process.

As shown by the above examples the break in the pH titration curve above which there is relatively little change in pH of the clay as alkali is added takes place over a quite limited increment in the amount of alkali added, an increment of about 0.2%, and usually of about 0.05% to 0.1%, in the alkali. It also occurs within a quite limited range of changing pH values of the clay, a range of about one unit in the scale of pH values and usually of only a few tenths variation in pH of the clay. In treating a clay the addition of alkaline material may differ to a small extent from that corresponding to the break in the pH titration curve and the benefits of our invention obtained to a considerable degree, so long as the amount is substantially that which raises the pH of the clay to the break in the titration curve. Thus, 0.1% of alkaline material more or less than that corresponding to the break in the curve may be used beneficially in treating the clay. Or putting this in terms of the pH of the clay treated with alkaline material, ordinarily the pH to which the clay is raised by treatment with alkaline material may vary about 0.5 above or below the pH corresponding to the break in the titration curve.

In the case of many clays the total alkaline material preferably is added as a compound of an alkali metal, e. g. as the hydroxide or carbonate of sodium, potassium or ammonium. In the case of acid clays, it frequently is very desirable to add calcium or magnesium oxide or hydroxide as a part of the alkaline material used to increase the pH of the clay to the desired degree. This use of calcium or magnesium oxide or hydroxide may improve the working qualities of the clay, the physical characteristics, such as color, strength, and resistance to moisture absorption, of the final product. For many clays about 0.025% to 0.05% of these alkaline earth oxides or hydroxides give the desired results. Clays containing a considerable amount of soluble sulfate, e. g. calcium sulfate, magnesium sulfate, ferric or ferrous sulfates or free sulfuric acid in amount greater than 350 parts per million of sulfate, calculated as $SO_4$, generally should be treated with a soluble compound forming insoluble sulfates, such as barium oxide, hydroxide or carbonate, in amount sufficient to bring the soluble sulfates in the clay to below 350 parts per million. There is then added to the clay a quantity of alkaline compound of an alkali metal sufficient to raise the pH of the clay substantially to that at which the break in the pH titration curve occurs. In all of the described procedures for adding to the clay alkaline material other than compounds of the alkali metals, the adjustment in pH of the clay is done only in part by those other alkaline materials and in every case a sufficient amount of alkaline compound of an alkali metal is added in adjusting the pH of the clay so that at least 20% of the base exchange capacity of the clay is saturated with alkali metal after addition of the alkaline material to the clays.

In referring to the base exchange capacity of a clay and saturation thereof with an alkali metal, we use these terms in the sense in which they are commonly used in this art. The base exchange capacity of a clay and its degree of saturation with an alkali metal may be determined by any of the several procedures known to the art as being suitable for this purpose.

If a clay does not contain more than 350 parts per million of sulfate, calculated as $SO_4$, it ordinarily may be used without special treatment to render insoluble these sulfates by addition of a barium compound. In that case, in employing the process of this invention for the treatment of the clay, the requisite amount of alkaline material to adjust the pH of the clay may be added wholly in the form of a compound of an alkali metal, or in part as an alkali metal compound and in part as another alkaline material.

It will be seen from the foregoing that our process involves not only an adjustment in the pH value of the clay but also an introduction into the clay of alkali metal which saturates the base exchange capacity of the clay to the extent of at least 20% after addition of the alkaline material. We would particularly point out that pH values of clays could be controlled by the addition of calcium oxide alone to the clay. This would result, however, in the clay being even less satisfactory for use in the stiff or soft mud processes than if no adjustment in the pH value were made. In order to obtain the advantages of the process of this invention, therefore, the adjustment of pH value of the clay is always made at least in part and to the extent described above, by addition of an alkaline compound of an alkali metal. When two or more alkaline materials are added to the clay, the order in which they are added is not important. Ordinarily, however, the alkali metal compound will be introduced last to bring about the final adjustment of the pH value of the clay mixture.

Numerous changes and modifications may be made in the above described processes without departing from the invention. While we have described in detail one method for titrating clay with alkali to determine the proper amount of alkaline material to be added to a clay, it is not necessary to use this particular process for titrating the clay. For example, instead of adding various proportions of alkaline material to a series of clay samples, one clay sample may be mixed in a beaker with water, the glass electrode immersed in the clay-water suspension, and a standardized solution of the alkaline material run in from a burette. The clay-water suspension is thoroughly stirred for 30 minutes between each alkali addition. A series of values for the pH of the clay with alkaline addition may thus be obtained and the addition of alkaline material to the clay when using it in the stiff or soft mud processes may be controlled, as described above, in accordance with the data thus obtained. Instead of titrating a suspension of the clay in water, water may be added to the clay in amount sufficient to give a plastic mass, together with varying proportions of the alkaline material. The pH values of a series of plastic clay masses thus prepared with varying proportions of alkaline material is then determined. A spear-type electrode has been found suitable for pH measurement of these plastic masses.

The process of this invention has been employed in the treatment of a large number of clays and we have obtained the following benefits as compared with using these clays without addition of alkaline material. The plasticity of the clay-water mixtures is increased while the mixture still is sufficiently stiff to be suitable for forming by the stiff or soft mud process. In the stiff mud process the increased plasticity decreases as much as 10% to 50% the power required to extrude the clay through dies giving it the desired form. The water-absorbing capacity of the finished product has been reduced 10% to 30%. Lamination in the structure of the product and the attendant ease of fracture of the product has been reduced. The strength of products made from a given clay has been greatly increased. The temperatures needed for proper firing of the clay have been reduced. The appearance, i. e. the color, has been improved. All these improvements may be obtained without the alkaline materials causing the fired products to have a glazed surface, which would make them unsuitable or would interfere with the proper glazing of the materials when this is desired.

The benefits obtained vary with the character of the particular clay treated and the particular type of plant operation. The following is a representative experience in a commercial plant operation using the process of this invention:

In a brick plant, shale treated with a small amount of barium carbonate was the raw material used. This clay material was fed to a mixing pan and after being crushed and screened was passed to a combination pug mill and brick machine. Sodium carbonate (soda ash) was fed to the pan at a rate sufficient to raise the pH of the clay-water mixture made in the pug mill to the predetermined favorable value of 8.0. This change in the pH of the clay resulted in its passing more readily through the die of the brick machine. The extruded clay column was stronger and, in cutting this column to form the bricks, the cut edges of the brick were smoother than when the plant was operating without the sodium carbonate addition to the clay. Moisture absorption tests of the fired brick showed a 5.4% absorption for brick made with clay untreated with sodium carbonate as compared with 2.93% absorption for brick made from clay to which the soda ash was added. These determinations were made by a 24-hour cold soak test. In a 5-hour boil test the untreated clay bricks showed a moisture absorption of 8.36%, whereas those formed from the clay treated with soda ash showed a moisture absorption of 5.38%. The crushing strength in pounds per square inch of brick made from the untreated clay was 6,874, whereas that for the brick made from clay treated with soda ash was 10,660.

We claim:

1. In the process for the production of clay products from common clays, by the stiff and soft mud processes, that improvement which comprises mixing with said clay an alkaline material in an amount which gives an acid clay a pH in the range of 7 to 9 and gives a non-acid clay a pH in the range of 8 to 10, and in amount further limited to that which in the alkalimetric titration of said clay mixed with water raises the pH of the clay substantially to those values at which the alkalimetric pH titration curve of the clay, within the respective range aforedescribed for said clay, changes from an initial section where an increment in the quantity of alkali causes a large increase in pH of the clay to a later section where the same increment in the quantity of alkali causes but a small increase in pH of the clay, said alkaline material including an alkaline compound of an alkali metal in amount such that the clay to which the alkaline material has been added has at least 20% of its base exchange capacity saturated with alkali metal.

2. In the process for the production of clay products from common clays, by the stiff and soft mud processes, that improvement which comprises mixing with said clay an alkaline material in an amount which gives an acid clay a pH in the range of 7 to 9 and gives a non-acid clay a pH in the range of 8 to 10, and in amount further limited to substantially that which in the alkalimetric titration of said clay mixed with water raises the pH of the clay to those values at which the decrease in the slopes $$\left(\frac{\Delta pH}{\Delta alkali}\right)$$

of the alkalimetric pH titration curve of the clay, within the respective range aforedescribed for said clay, is at least substantially twice as great as the decrease in the slopes of said curve at higher pH values, said alkaline material including an alkaline compound of an alkali metal in amount such that the clay to which the alkaline material has been added has at least 20% of its base exchange capacity saturated with alkali metal.

3. In the process for the production of clay products from a non-acid, common clay by the stiff and soft mud processes, that improvement which comprises mixing with said clay an alkaline compound of an alkali metal in an amount which gives said clay a pH in the range of 8 to 10 and such that the clay to which the alkaline compound has been added has at least 20% of its base exchange capacity saturated with alkali metal, the amount of alkaline compound mixed with the clay being further limited to substantially that which in the alkalimetric titration of said clay mixed with water raises the pH of the clay to those values at which the decrease in the slopes $$\left(\frac{\Delta pH}{\Delta alkali}\right)$$

of the alkalimetric pH titration curve of the clay, within the respective range aforedescribed for said clay, is at least substantially twice as great as the decrease in the slopes of said curve at higher pH values.

4. In the process for the production of clay products from a non-acid, common clay by the stiff and soft mud processes, that improvement which comprises mixing soda ash with said clay in an amount which gives the clay a pH in the range of 8 to 10 and such that the clay to which the soda ash has been added has at least 20% of its base exchange capacity saturated with sodium, the amount of soda ash mixed with the clay being further limited to substantially that which in the alkalimetric titration of said clay mixed with water raises the pH of the clay to those values at which the decrease in the slopes $$\left(\frac{\Delta pH}{\Delta alkali}\right)$$

of the alkalimetric pH titration curve of the clay, within the respective range aforedescribed for said clay, is at least substantially twice as great as the decrease in the slopes of said curve at higher pH values.

5. In the process for the production of clay products from acid common clays by the stiff and soft mud processes, that improvement which comprises mixing with said clay an alkaline compound of an alkaline earth metal and an alkaline compound of an alkali metal in amounts which give said clay a pH in the range of 7 to 9 and in amounts further limited to that which in the alkalimetric titration of said clay mixed with water raises the pH of the clay substantially to those values at which the alkalimetric pH titration curve of the clay, within the range aforedescribed for said clay, changes from an initial section where an increment in the quantity of alkali causes a large increase in pH of the clay to a later section where the same increment in the quantity of alkali causes but a small increase in pH of the clay, said alkaline compound of an alkali metal being mixed with the clay in amount such that at least 20% of the base exchange capacity of the clay is saturated with alkali metal after addition thereto of the compound of the alkali metal.

6. In the process for the production of clay products from acid common clays by the stiff and soft mud processes, that improvement which comprises mixing with said clay 0.025% to 0.05% calcium hydroxide and an amount of soda ash which raises the pH of the clay to those values within the range of pH 7 to 9 at which the decrease in the slopes $$\left(\frac{\Delta pH}{\Delta alkali}\right)$$

of the alkalimetric pH titration curve of the clay with sodium carbonate is at least substantially twice as great as the decrease in the slopes of said curve at higher pH values and the clay to which the soda ash has been added has at least 20% of its base exchange capacity saturated with sodium.

7. In the process for the production of clay products by the stiff and soft mud processes from common clays containing soluble sulfates, that improvement which comprises mixing with said clay a compound of barium from the group consisting of barium oxide, hydroxide and carbonate to form insoluble barium sulfate with said soluble sulfates and mixing with said clay an alkaline material including an alkaline compound of an alkali metal in an amount which gives an acid clay a pH in the range of 7 to 9 and gives a non-acid clay a pH in the range of 8 to 10 and in amount further limited to that which in the alkalimetric titration of said clay mixed with water and said barium compound raises the pH of the clay substantially to those values at which the alkalimetric pH titration curve of the clay, within the respective range aforedescribed for said clay, changes from an initial section where an increment in the quantity of alkali causes a large increase in pH of the clay to a later section where the same increment in the quantity of alkali causes but a small increase in pH of the clay, said alkali metal compound being mixed with the clay in amount such that at least 20% of the base exchange capacity of the clay is saturated with alkali metal after addition thereto of the compound of the alkali metal.

8. In the process for making clay products from common clay by the stiff and soft mud processes that improvement which comprises titrating said clay with alkali and thereby determining the pH values at which the alkalimetric pH titration curve of the clay, in the range of pH 7 to 9 for an acid clay and pH 8 to 10 for a non-acid clay, changes from an initial section where an increment in the quantity of alkali causes a large increase in pH of the clay to a later section where the same increment in the quantity of alkali causes but a small increase in pH of the clay, and in the manufacture of clay products from said clay incorporating with the clay used to produce a plastic mass for shaping in the stiff and soft mud processes an amount of alkaline material which raises the pH of the clay to substantially the first mentioned pH values, said alkaline material including an alkaline compound of an alkali metal in amount such that the clay to which the alkali metal compound has been added has at least 20% of its base exchange capacity saturated with alkali metal.

9. In the process for the production of clay products by the stiff and soft mud processes from common clays containing more than 350 parts per million (calculated as $SO_4$) of soluble sulfates, that improvement which comprises mixing with said clay a compound of barium from the group consisting of the oxide, hydroxide and carbonate of barium in amount sufficient to reduce the soluble sulfates in the clay to below 350 parts per million (calculated as $SO_4$) and additionally mixing with said clay soda ash in an amount which gives an acid clay a pH in the range of 7 to 9 and gives a non-acid clay a pH in the range of 8 to 10 and such that the clay to which the soda ash has been added has at least 20% of its base exchange capacity saturated with sodium, the amount of said soda ash further being limited to substantially that which in the alkalimetric titration of said clay mixed with water and said barium compound raises the pH of the clay to those values at which the decrease in the slopes $$\left(\frac{\Delta pH}{\Delta alkali}\right)$$

of the alkalimetric pH titration curve of the clay, within the respective range aforedescribed for said clay, is at least substantially twice as great as the decrease in the slopes of said curve at higher pH values.

GEORGE J. BARKER.
EMIL TRUOG.